United States Patent
Kawauchi et al.

(10) Patent No.: US 6,749,008 B2
(45) Date of Patent: Jun. 15, 2004

(54) VEHICLE AIR-CONDITIONING SYSTEM

(75) Inventors: Hisashi Kawauchi, Kariya (JP); Masahiro Kanbara, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/411,472

(22) Filed: Apr. 10, 2003

(65) Prior Publication Data

US 2003/0192334 A1 Oct. 16, 2003

(30) Foreign Application Priority Data

Apr. 11, 2002 (JP) ........................................ 2002-109301

(51) Int. Cl.[7] ................................................. B60H 3/00
(52) U.S. Cl. ..................... 165/42; 62/244; 237/12.3 B; 454/121
(58) Field of Search ............................... 62/244; 165/42, 165/43; 237/12.3 A, 12.3 B; 454/121, 156

(56) References Cited

U.S. PATENT DOCUMENTS 4,842,047 A * 6/1989 Sakurada et al. ............. 165/43
6,032,723 A * 3/2000 Tsuihiji et al. ............... 165/42
6,351,961 B1 * 3/2002 Kurokawa et al. ........... 62/244

FOREIGN PATENT DOCUMENTS

JP          2001-150923          6/2001

* cited by examiner

Primary Examiner—William E. Tapolcai
(74) Attorney, Agent, or Firm—Harness, Dickey & Pierce, PLC

(57) ABSTRACT

A vehicle air conditioning system has an interior unit in which a width dimension, that is, a dimension parallel to the width of the vehicle, is smaller than competing devices. A blower unit, an evaporator as a cooling heat exchanger, and a heater core as a heating heat exchanger are integrally disposed inside a casing for blowing air toward a vehicle compartment. A face passage is formed above the heater core such that the temperature-controlled air passes through the heater core and is lead to a face opening by the face passage. A foot passage is formed inside the casing and above the heater core so as to protrude from the rear face of the casing toward the face passage. A foot door for opening and closing a foot opening of the foot passage is disposed inside the face passage.

4 Claims, 4 Drawing Sheets

VEHICLE AIR-CONDITIONING SYSTEM

CROSS REFERENCE TO RELATED APPLICATION

This application is based upon, claims the benefit of priority of, and incorporates by reference the contents of prior Japanese Patent Application No. 2002-109301 filed Apr. 11, 2002.

BACKGROUND OF THE INVENTION

1. Field of the Invention

The present invention relates to a vehicle air-conditioning system interior unit in which an interior dimension, with respect to a cross direction of the vehicle, is reduced.

2. Description of the Related Art

Japanese Patent Laid-Open Publication No. 2001-150923 discloses a conventional interior unit for a vehicle air-conditioning system, which integrates a blower unit as well as a cooling heat exchanger and a heating heat exchanger into a single casing.

In this prior art, a cooling heat exchanger is disposed below a blower unit, then a heating heat exchanger is disposed behind this cooling heat exchanger in a rearward direction of a vehicle, and an air mix door is disposed above this heating heat exchanger. In addition, a face passage for leading air into a face opening and a defroster opening is disposed in a position behind the blower unit in the rearward direction of the vehicle and above the air mix door. Moreover, further behind a warm air passage positioned behind the heating heat exchanger, a foot passage is independently disposed in the rearward direction of the vehicle.

Therefore, in the prior art, the cooling heat exchanger and the heating heat exchanger are disposed in series within the interior unit in the cross direction of the vehicle, that is in a left to right direction. In addition, the foot passage is independently disposed further behind the warm air passage located on the back of the heating heat exchanger in the rearward direction of the vehicle. As a result, the dimension of the interior unit in the cross direction of the vehicle is substantially increased.

Meanwhile, space availability is limited with respect to the cross direction of the vehicle in an area inside an instrument panel where the interior unit is installed. Therefore, installability of the interior unit is substantially deteriorated by an increase in the dimension of the interior unit in the cross direction of the vehicle.

SUMMARY OF THE INVENTION

In consideration of the foregoing problem, an object of the present invention is to reduce the cross dimensional dimension of such an interior unit to ease installation in a vehicle.

To attain the object, a first aspect of the present invention exhibits a vehicle air-conditioning system that includes a casing (11) configured to define air passages for sending air to a vehicle compartment and having a face opening (22) disposed in an upper part of the casing (11). Additionally, this aspect of the invention includes a heating heat exchanger (14) disposed inside the casing (11) and configured to heat the air, a face passage (24) formed above the heating heat exchanger (14) inside the casing (11) and configured to lead the air being temperature-conditioned by passage through the heating heat exchanger (14) toward the face opening (22), and a foot passage (27) formed above the heating heat exchanger (14) inside the casing (11) to protrude from a rear face (11a) of the casing (11) toward the face passage (24) and configured to extend in a vehicle's width direction. Continuing, the foot passage (27) has a foot opening (27a) disposed in a region of the foot passage (27) close to the face passage (24). A foot door (28) is disposed to rotate inside the face passage (24) and configured to open and close the foot opening (27a). Here, the air being temperature-conditioned by passage through the heating heat exchanger (14) flows from the foot opening (27a) into the foot passage (27) when the foot opening (27a) is opened by the foot door (28), and blows out of both right and left side portions, in a width direction of the vehicle, of the foot passage (27) toward the feet of any passengers.

According to this aspect, the foot door (28) is disposed inside the face passage (24), and the foot passage (27) is formed above the heating heat exchanger (14) so as to protrude toward the face passage (24). Therefore the air, after passage through the heating heat exchanger, further passes through the foot opening (27a) and the foot passage (27) and then blows out of the right and left side portions of the foot passage (27) directly toward the feet of any passengers.

Accordingly, it is not necessary to dispose the foot passage (27) further behind the rear face (11a) of the casing (11) in the rearward direction of the vehicle, and it is thereby possible to downsize the dimension of the interior unit with respect to the width of the vehicle in comparison with the prior art.

A second aspect of the present invention is the vehicle air-conditioning system of the first aspect, in which a blower unit (12) for blowing air is disposed in front of the face passage (24), with respect to the cross direction of the vehicle, and inside the casing (11). In this way, the interior unit (10) which is configured to dispose the blower unit (12) integrally inside the casing (11) undergoes a downsizing effect with respect to a dimension in the cross direction of the vehicle.

A third aspect of the present invention is the vehicle air-conditioning system of the second aspect, in which the blower unit (12) is disposed above and in front of the face passage (24), with respect to the cross direction of the vehicle, and inside the casing (11). Additionally, a cooling heat exchanger (13), configured to cool down the air sent from the blower unit (12), is disposed below the blower unit (12), and the heating heat exchanger (14) is disposed behind the cooling heat exchanger (13) with respect to the cross direction of the vehicle. In this way, the interior unit (10) which is configured to integrally contain all of the blower unit (12), the cooling heat exchanger (13), and the heating heat exchanger (14) inside the casing (11), has a downsizing effect with respect to a cross direction dimension, that is, the width, of the vehicle.

A fourth aspect of the present invention is the vehicle air-conditioning system of any one of the first to third aspects in which the foot door (28) is a butterfly door that includes a rotating shaft (28a), and a first plate door (28b) and a second plate door (28c) are integrally bonded to both sides in a diametrical direction of the rotating shaft (28a). According to this aspect, forces and pressure due to wind acting on the first plate door (28b) and the second plate door (28c) simultaneously act as a reverse rotating force while applying the rotating shaft (28a) as a pivot, so that the forces attributable to the wind pressure onto the first and second plate doors (28b, 28c) counterbalance each other. As a result, it is possible to reduce a control force of the foot door (28).

A fifth aspect of the present invention is the vehicle air-conditioning system of the fourth aspect, in which an air mix door (16) is disposed between the heating heat exchanger (14) and the butterfly door (28) in a vertical direction inside the casing (11). Here, a proportion of air quantities between warm air passing through the heating heat exchanger (14) and cool air bypassing the heating heat exchanger (14) is adjusted by the air mix door (16) to control the temperature of air blowing into the compartment. Moreover, the first plate door (28b) separates air in a warm air region from air in a cool air region when the butterfly door (28) is set to a halfway open position, and leads the air in the warm air region toward the foot passage (27) and the air in the cool air region toward the face passage (24). Furthermore, an auxiliary passage (30) is formed close to a tip of the second plate door (28c) such that the air in the warm air region being led to the foot passage (27) is partially divided and directed toward the face passage (24).

In this way, when the vehicle air-conditioning system is set to a blowing mode like a bi-level mode such that the conditioned air blows out of the face opening (22) toward the face of a passenger (upward) and the conditioned air simultaneously blows out of both right and left side portions of the foot passage (27) toward the feet of the passenger (downward), it is possible to prevent an excessive increase in the temperature difference between the air blowing to the face and the air blowing to the feet. Such a temperature difference is attributable to an excessive drop in the temperature of the air blowing to the face.

In other words, the auxiliary passage (30) divides and leads part of the air in the warm air region toward the face passage (24) (see arrow d2 in FIG. 2, to be described later). Accordingly, the temperature difference between the air blowing upward and the air blowing downward can be set within a comfortable temperature difference range by increasing the temperature of the air blowing to the face. Eventually, it is possible to achieve improvement in comfort air-conditioning in the bi-level mode.

A sixth aspect of the present invention is the vehicle air-conditioning system of the fifth aspect, in which a warm air guide wall (19), configured to guide the warm air passing through the heating heat exchanger (14) toward the cool air, is formed to protrude from the rear face (11a) of the casing (11) to an upside of the heating heat exchanger (14), and the foot passage (27) is formed above the warm air guide wall (19). In this way, it is possible to form the foot passage (27) while effectively using the space above the warm air guide wall (19).

The parenthesized reference numerals quoted in the respective above aspects correspond to the respective items in the drawings. Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
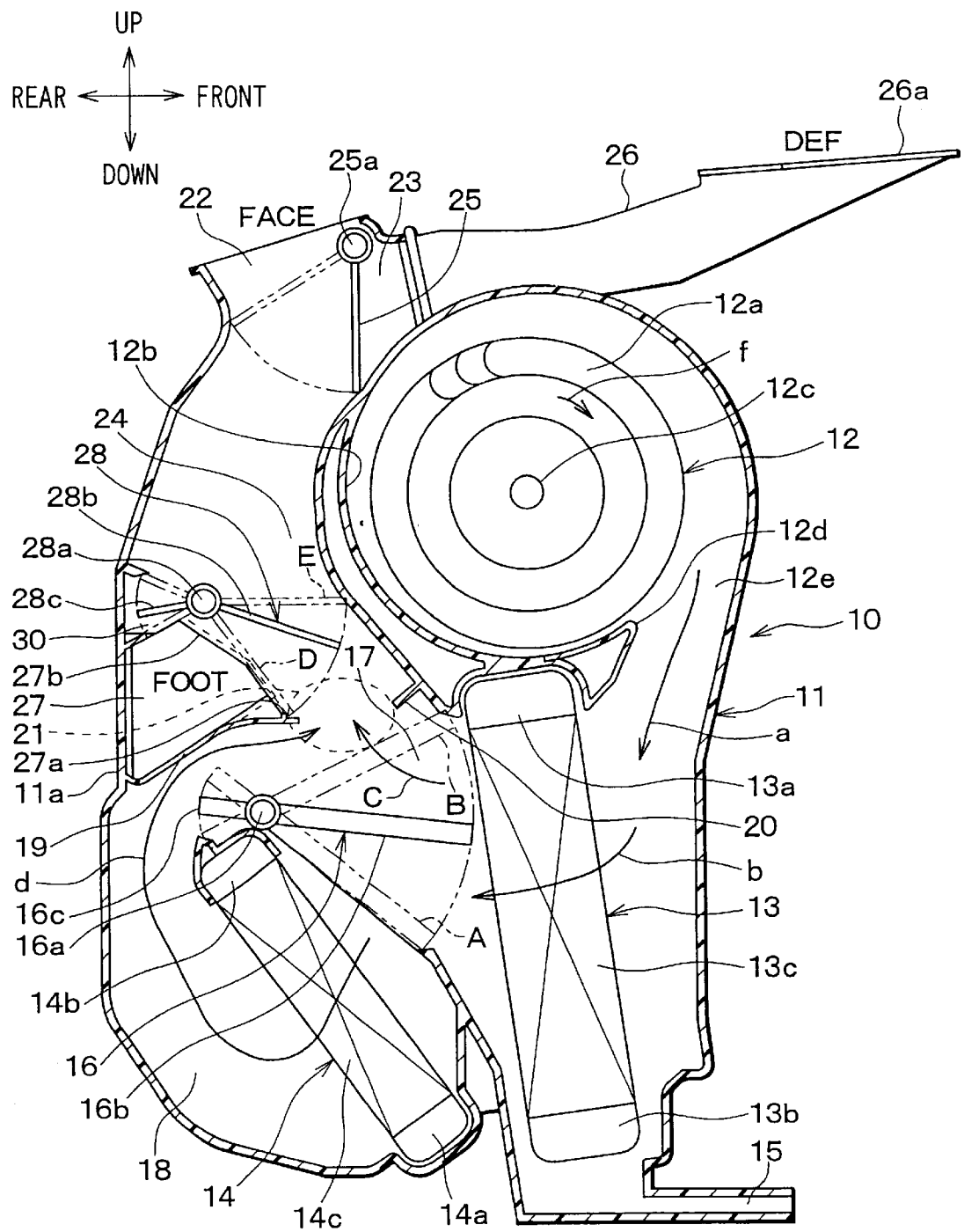
FIG. 1 is a cross-sectional view of an interior unit according to an embodiment of the present invention.
Figure 2:
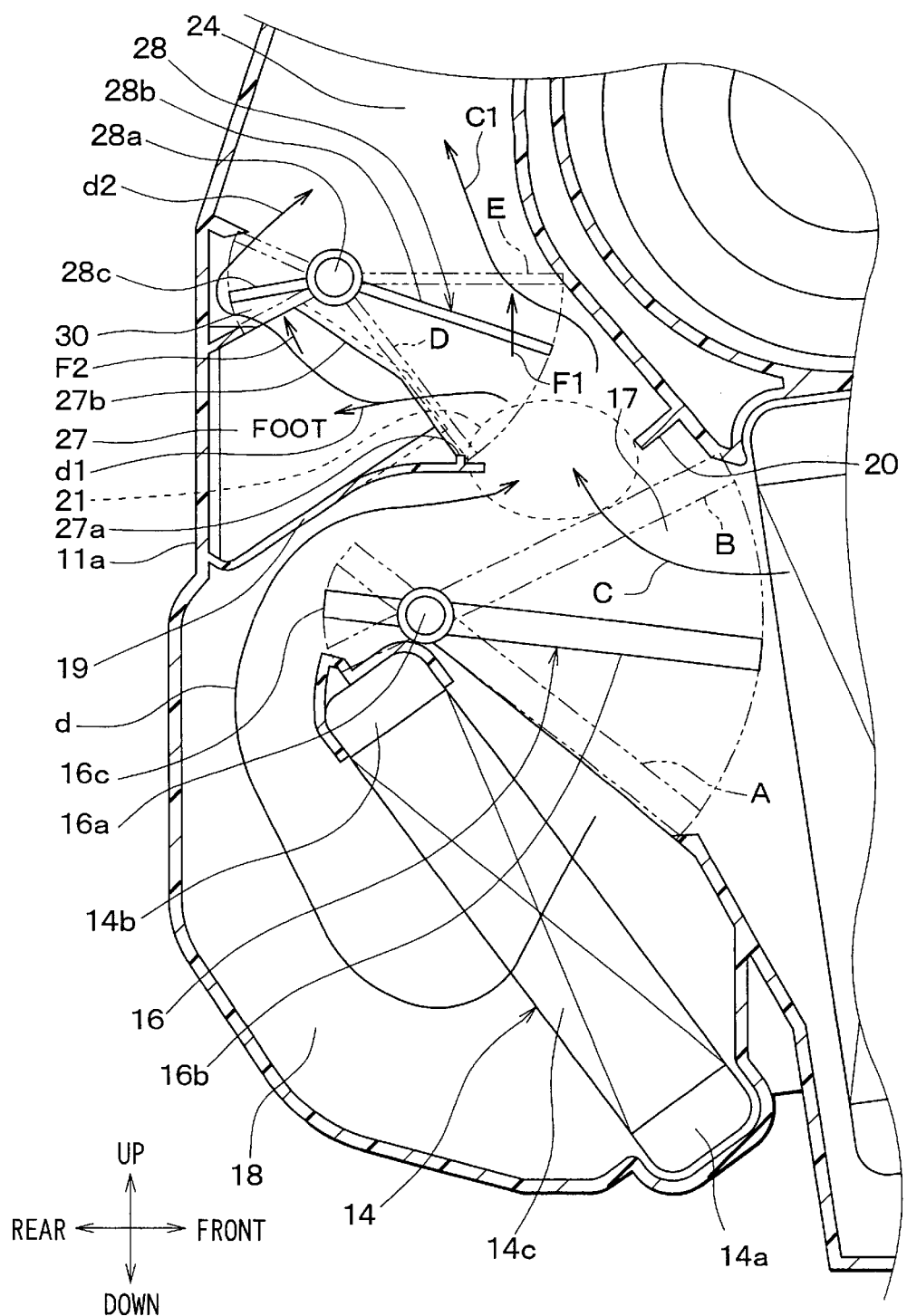
FIG. 2 is an enlarged cross-sectional view of an essential part of the interior unit in FIG. 1.

Now, an embodiment of the present invention will be described with reference to the accompanying drawings. FIG. 1 is a schematic cross-sectional view showing a configuration of an interior unit 10 of a vehicle air-conditioning system according to this embodiment. FIG. 2 is an enlarged cross-sectional view of an essential part of the interior unit 10. The interior unit 10 is disposed approximately in the center in a width (right-to-left) direction of a vehicle inside an instrument panel (not shown) in front of the passenger compartment, with respect to the vehicle orientation. Along these lines, the interior unit 10 is installed as necessary with respect to the vertical and horizontal directions of the vehicle as indicated by the locational arrow legend in FIG. 1. Additionally, the width direction of the vehicle is the direction perpendicular to the sheet on which FIG. 1 is located.

Figure 4:
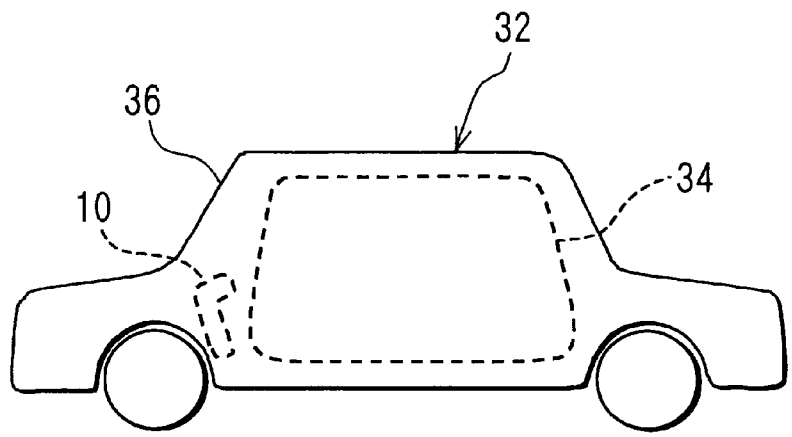
FIG. 4 is a perspective view of a vehicle showing the general location of the interior unit.
Figure 5:
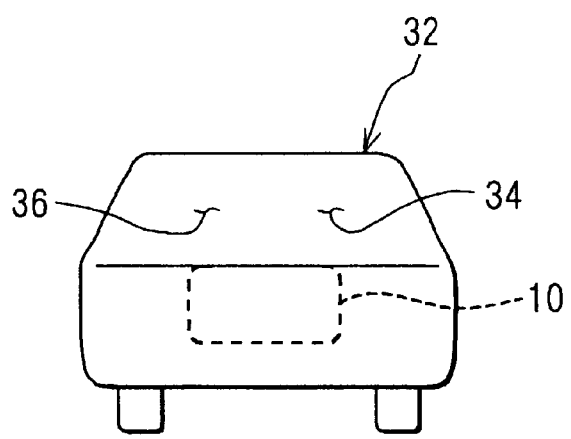
FIG. 5 is a front view of a vehicle in which the interior unit is shown.

FIGS. 4 and 5 show representative examples of the location of the interior unit 10 within a vehicle 32. FIG. 4 shows the vehicle 32 with an interior unit 10 located proximate to the front of the vehicle 32. The vehicle interior compartment 34, which is to be heated and/or cooled by the interior unit 10 is shown by a dashed line. The interior unit 10 is located proximate to the vehicle front windshield 36 for heating and/or cooling the surface of the windshield 36. FIG. 5 is a front view of a vehicle 32 showing a representative location of the interior unit 10 below the vehicle windshield 36 and its left-to-right position relative to the width of the vehicle 32. In FIG. 5, the interior unit 10 is shown in a central location with respect to the width of the vehicle 32.

The interior unit 10 of this embodiment includes a casing 11 which defines air passages for sending air toward the compartment. A blower unit 12, an evaporator 13 serving as a cooling heat exchanger, and a heater core 14 serving as a heating heat exchanger are integrally disposed inside this single casing 11.

To be more precise, the casing 11 is formed into a vertically oriented case by integrally fastening right and left separate case bodies that are split along a section located in the center of the interior unit 10. The right and left separate case bodies are formed of a resin material which possesses appropriate elasticity and high mechanical strength, such as polypropylene.

The blower unit 12 is disposed in an upper side of a front region (a region close to a front side of the vehicle) inside the casing 11. Meanwhile, the evaporator 13 is disposed below the blower unit 12. The blower unit 12 contains a centrifugal blower fan 12a rotated by an electric motor inside the scroll casing 12b. A rotating shaft 12c of the blower unit 12 extends along the width direction of the vehicle. Accordingly, an air intake (not shown) for the centrifugal blower fan 12a is located at one of the side faces in the width direction of the interior unit 10. Moreover, an unillustrated air switch box is connected to this air intake, and indoor air (the air inside the compartment) or outside air (the air outside the compartment) taken in through this air switch box is sent by the blower fan 12a.

Meanwhile, a nose 12d which is a starting point of the scroll of the scroll casing 12b is positioned at a lower portion of scroll casing 12b, and an air outlet 12e of the scroll casing 12b is directed downward adjacent to the nose 12d. Therefore, the air sent out by the blower fan 12a flows from an upper side to a lower side in the front region, as indicated by the arrow "a", toward a front side of the evaporator 13.

The evaporator 13 is formed into a thin box of an approximately rectangular shape having almost the same width as that of the casing 11 in the width direction of the vehicle. The evaporator 13 is placed almost, or substantially, vertically. A low-pressure refrigerant depressurized by a depressurizing means (not shown) of a refrigeration cycle is introduced into this evaporator 13. This low-pressure refrigerant is evaporated while absorbing heat from the air sent from the blower fan 12a, thereby cooling the air.

A bottom portion of the casing 11 located below the evaporator 13 constitutes a condensed water receiver. A condensed water discharge pipe 15 is formed at the lowest part of the casing 11. As publicly known, the evaporator 13 has a constitution including upper and lower tanks 13a and 13b, and a heat exchanger unit 13c having a laminated structure of flat tubes and corrugated heat transfer fins. The heat exchanger unit 13c is disposed between the tanks 13a and 13b. The air sent by the blower fan 12 flows through this heat exchanger unit 13c from the front side to the rear side of the vehicle as indicated by the arrow "b."

Moreover, the heater core 14 is disposed downstream of the air from the evaporator 13, i.e. on the rear side of the evaporator 13 inside the casing 11. This heater core 14 heats the air by use of hot water (coolant water) from a vehicle engine (not shown) as a heat source. The heater core 14 includes a hot water inlet tank 14a on a lower end and a hot water outlet tank 14b on an upper end that are disposed at a given interval. A heat exchanger unit 14c has a laminated structure of flat tubes and corrugated heat transfer fins. Here, the heat exchanger unit 14c is disposed between the tanks 14a and 14b.

This heater core 14 is disposed aslant, that is, diagonally, such that the upper hot water outlet tank 14b is more inclined toward the rear of the vehicle than the lower hot water inlet tank 14a. Accordingly, a rotating shaft 16a of a plate-shaped air mix door 16 is disposed close to an upper end of the heater core 14, whereby a space for rotational operation of the air mix door 16 is secured between the heater core 14 and the evaporator 13.

Here, the air mix door 16 is formed into a butterfly door which includes a first plate door 16b and a second plate door 16c that are integrally (diametrically) bonded to opposite sides of the rotating shaft 16a. The rotating shaft 16a of the air mix door 16 is disposed so as to extend in the direction perpendicular to the sheet of FIG. 1 (in the width direction of the vehicle), and both ends of the rotating shaft 16a are rotatably retained by bearing holes (not shown) provided at sidewall portions of the casing 11.

Inside the casing 11, a cool air bypassing passage 17 is formed above the heater core 14 (at the rear side of the evaporator 13) so as to direct the cool air as indicated by the arrow "C" while bypassing the heater core 14. On the other hand, inside the casing 11, a warm air passage 18 is formed in a region of the heater core 14 beginning from the rear side until reaching the upper side thereof. The warm air heated by the heater core 14 flows in the warm air passage 18 as indicated by the arrow "d." A warm air guide wall 19 is formed on the casing 11 so as to protrude from the rear face 11a of the casing 11 toward the upper side of the heater core 14. This warm air guide wall 19 partitions an upper side of the warm air passage 18, and guides the flow of the warm air in the warm air passage 18 toward the cool air bypassing passage 17 as indicated by the arrow "d."

Moreover, inside the casing 11, a cool air guide wall 20 is formed on a wall surface of the casing 11 adjacent to the cool air bypassing passage 17 so as to be opposed to a tip of the warm air guide wall 19. This cool air guide wall 20 guides the flow of the cool air in the cool air bypassing passage 17 toward the warm air side of the warm air passage 18. In this way, an air mixing unit 21 for favorably mixing the warm air and the cool air is formed in a position above the heater core 14 and around the tips of both guide walls 19 and 20.

In FIG. 1, the position of the air mix door 16 drawn with solid lines is the halfway open position of the door. Meanwhile, the position of the air mix door 16 noted with an "A" and drawn with chain double-dashed lines is the maximum cooling position in which the air passage of the heater core 14 is completely closed and the cool air bypassing passage 17 is completely opened. On the contrary, the position of the air mix door 16 noted with a "B" and drawn with chain double-dashed lines is the maximum heating position in which the cool air bypassing passage 17 is completely closed and the air passage of the heater core 14 is completely opened.

As publicly known, the air mix door 16 is a temperature controlling means for controlling the temperature of the air blowing into the compartment by adjusting a proportion of the air quantities between the warm air passing through the heat exchanger unit 14c, as indicated by the arrow "d", and the cool air passing through the cool air bypassing passage 17 while bypassing the heater core 14 as indicated by the arrow "C." Accordingly, the warm air, noted by arrow "d", and the cool air, noted by arrow "C", are mixed together at the air mixing unit 21 (an air mixing location), and the air at a desired temperature is thereby obtained.

Meanwhile, a face opening 22 is opened in the upper part of the casing 11 toward the rear of the vehicle, and a defroster opening 23 is opened at the front side of this face opening 22. A face passage 24 is formed inside the casing 11 so as to extend directly upward from the air mixing unit 21 to the face opening 23.

A face door 25 is disposed in the upper part of the casing 11 for selectively opening and closing the face opening 22 and the defroster opening 23. This face door 25 is formed of a plate door which is retained rotatably on the casing 11 by a rotating shaft 25a. The face opening 22 blows air out to a face of a passenger through a face duct (not shown). A defroster duct 26 is connected to the defroster opening 23, and the air blows out of a defroster outlet 26a on the tip of this defroster duct 26 toward the inner surface of the front windshield of the vehicle.

Meanwhile, a foot passage 27 is formed above the warm air guide wall 19 inside the casing 11. This foot passage 27 is defined by a space surrounded by the rear face 11a on the rear side of the casing 11, by the warm air guide wall 19, and by a foot door 28, to be described later. The foot passage 27 is formed so as to protrude from the rear face 11a of the casing 11 toward the face passage 24 (to the front side of the vehicle).

A region of the foot passage 27 close to the face passage 24 is made completely open to the face passage 24, and a foot opening 27a is thereby formed. This foot opening 27a is opened and closed by a foot door 28. The foot passage 27 is formed so as to extend inside the casing 11 throughout its length in the width direction of the vehicle. Side openings 27b are open at both right and left ends of the foot passage 27 in the width direction of the vehicle, i.e. at both right and left side faces of the casing 11. A foot duct (not shown) is connected to each of the side openings 27b on the right and left sides that they hang downward. Accordingly, the air blows out of the foot outlets at the bottom of these foot ducts toward the feet of the passenger(s).

In the meantime, the foot passage 27 is located at an approximately central region in the vertical direction of the casing 11. The face passage 24 (the air mixing unit 21) is located at the front side of the foot passage 24. Meanwhile, the upper end of the evaporator 13 (the lowest part of the scroll casing 12b) is located at the front side of the face passage 24 (the air mixing unit 21).

The foot door 28 is formed into a butterfly door which includes a first plate door 28b and a second plate door 28c that are integrally bonded to both sides in a diametrical direction of a rotating shaft 28a. In this embodiment, the first plate door 28b and the second plate door 28c are integrally bonded to the rotating shaft 28a in a doglegged shape. The rotating shaft 28a of this foot door 28 is disposed so as to extend above the foot passage 27 in the direction perpendicular to the sheet of FIG. 1 (in the width direction of the vehicle), and both ends of the rotating shaft 28a are rotatably retained by bearing holes (not shown) provided at the sidewall portions of the casing 11.

The foot door 28 is provided for switching the foot opening 27a of the foot passage 27 and the face passage 24. A position of the foot door 28 drawn with solid lines in FIGS. 1 and 2 shows either a bi-level mode or a foot defroster mode where the foot opening 27a of the foot passage 27 and the face passage 24 are both opened to the same degree at the same time. To the contrary, a position D of the foot door 28 drawn with chain double-dashed lines in FIGS. 1 and 2 shows a face mode position where the foot opening 27a of the foot passage 27 is completely closed and the face passage 24 is completely opened. Meanwhile, a position "E" of the foot door 28 drawn with chain double-dashed lines in FIGS. 1 and 2 shows a foot mode position where the face passage is completely closed and the foot opening 27a of the foot passage 27 is completely opened.

Here, the face door 25 and the foot door 28 collectively constitute a blow mode switching door. The rotating shafts 25a and 28a of these doors 25 and 28 are mutually joined to a blow mode operating mechanism via a link mechanism (not shown) outside the casing 11. Accordingly, this blow mode operating mechanism interlocks these doors 25 and 28, and rotates these doors 25 and 28 to given positions.

Similarly, the rotating shaft 16a of the air mix door 16 is also joined to a temperature control operating mechanism via a link mechanism outside the casing 11. Accordingly, this temperature control operating mechanism controls a position of rotation (an open angle) of the air mix door 16. This blow mode operating mechanism and temperature control operating mechanism may be composed of either an automatic operating mechanism using a servo motor or a manual operating mechanism to be manually operated by hand power of the passenger.

Next, description will be made regarding an operation of this embodiment based on the aforesaid configuration. When the electric motor of the blower unit 12 is turned on and the centrifugal blower fan 12a starts rotating in the direction of the arrow "f", either the indoor air or the outdoor air is taken in from the air switch box (not shown). The air thus taken in is sent inside the scroll casing 12b by the blower fan 12a, and the air flows, as indicated by the arrow "a", from the upper portion to the lower portion in the front region within the casing 11 toward the front side of the evaporator 13.

Thereafter, the air passes through the evaporator 13 from the front side to the rear side of the vehicle as indicated by the arrow "b." In this way, the air is cooled. Subsequently, the cool air is divided into the cool air "C" which passes through the cool air bypassing passage 17 and the warm air "d" which passes through the heater core 14 depending on the open angle of the air mix door 16. The cool air "C" and the warm air "d" are mixed in the vicinity of the air mixing unit 21. Therefore, the air mixing unit 21 obtains the air at a desired temperature by adjusting the proportion of air quantities between the cool air "C" and the warm air "d."

Next, description will be made regarding an operation for switching the flow mode. Assuming that the face mode is selected, the blow mode operating mechanism (not shown) moves the face door 25 to the position drawn with the solid lines where the face opening 22 is completely opened and the defroster opening 23 is completely closed. Simultaneously, the blow mode operating mechanism moves the foot door 28 to the position D drawn with the chain double-dashed lines where the foot opening 27a of the foot passage 27 is completely closed and the face passage 24 is completely opened.

Therefore, air-conditioned air which is adjusted to the desired temperature by the air mix door 16 (which is mainly the cool air in the face mode) flows from the air mixing unit 21 into the face opening 22 via the face passage 24, then blows out of this face opening 22 toward the face of the passenger for cooling the compartment. Here, the air mix door 16 is moved to the maximum cooling position "A" or thereabout in the face mode. Accordingly, the cool air that passed through the evaporator 13 flows in a nearly straight air passage from downstream of the evaporator 13 (the rearward region of the vehicle) through the air mixing unit 21 and the face passage 24 to the face opening 22. Therefore, a bending pressure loss minimally occurs in this nearly straight air passage, and air quantity can be increased accordingly.

Next, when the bi-level mode is selected, the blow mode operating mechanism (not shown) moves the face door 25 and the foot door 28 to the positions drawn with the solid lines in FIG. 1 which moves the foot door 28 to the halfway open position. Accordingly, the foot opening 27a of the foot passage 27 and the face passage 24 are made to open at about the same degrees at the same time.

Therefore, the air subjected to the temperature control by the air mix door 16 partially flows out of the air mixing unit 21 and passes through the face passage 24, and eventually blows out of the face opening 22 toward the face of the passenger(s). Simultaneously, the rest of the conditioned air flows out of the air mixing unit 21 and into the foot opening 27a and the foot passage 27. The air further flows out of this foot passage 27 to the side openings 27b located at both the right and left side portions of the casing 11. Eventually, the conditioned air blows out of these side openings 27b toward the feet of the passenger(s).

In this way, the conditioned air blows both upward and downward in the compartment at the same time during the bi-level mode. In order to create comfort air-conditioning, it is preferred that the temperature of the upward airflow from the face opening 22 is appropriately set lower than the temperature of the downward airflow from the foot passage 27, by 10C to 20C, for example.

Figure 3:
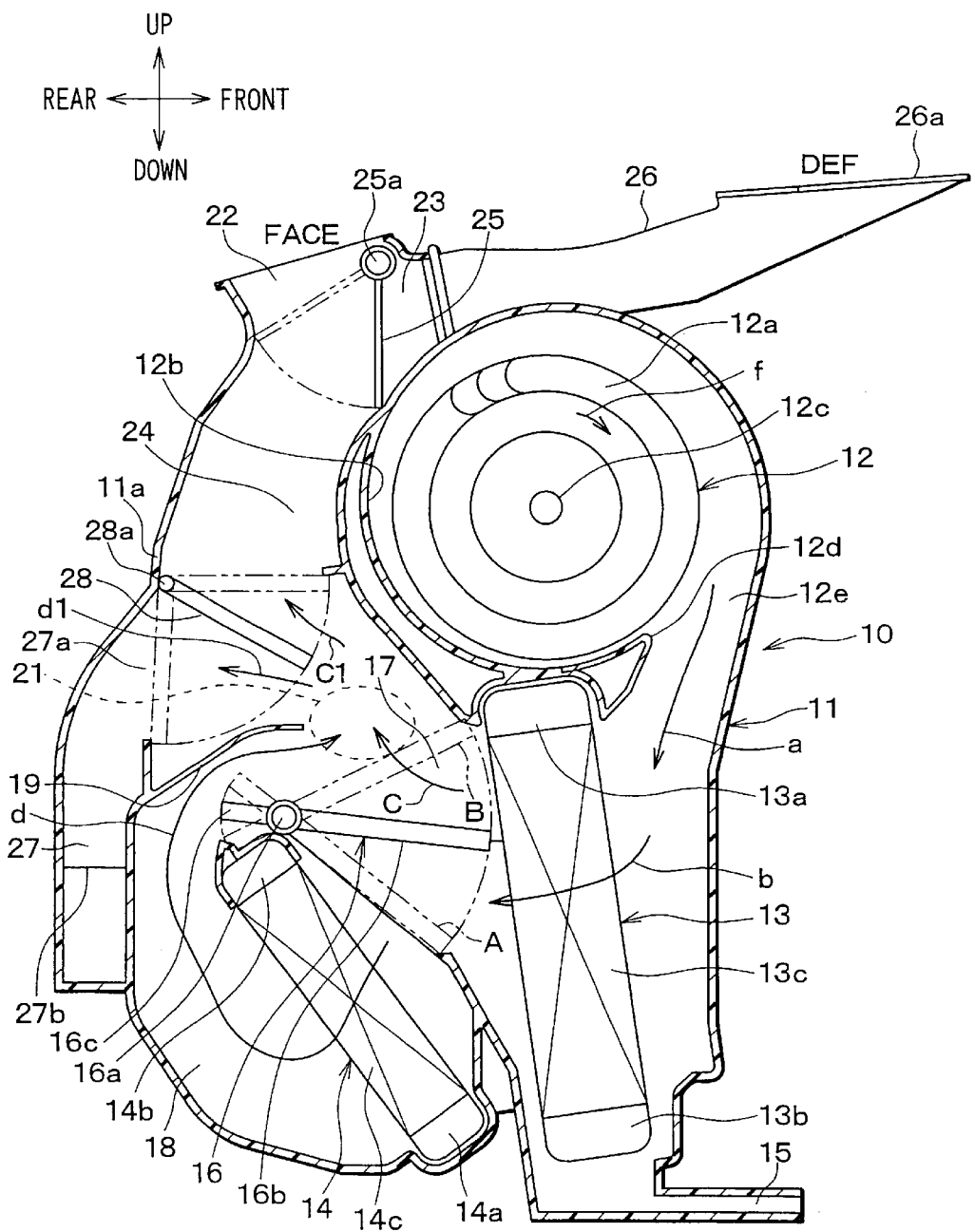
FIG. 3 is a cross-sectional view of an interior unit according to a comparative example of the present invention.

If the foot door 28 is formed into a normal plate door of a cantilever type as shown in the comparative example of FIG. 3, and if the rotating shaft 28a of the foot door 28 is disposed next to the rear face 11a of the casing 11, then a plate surface of the foot door 28 divides the cool air "C" and the warm air "d" inside the air mixing unit 21 when the foot door 28 is moved to the halfway open position shown with the solid line. Therefore, only the cool air "C1" flows in the face passage 24 and only the warm air "d1" flows from the foot opening 27a to the foot passage 27. As a result of an experiment by the inventor, it is apparent that the temperature difference between the upward air and the downward air increases excessively up to 30C in the comparative example of FIG. 3, and comfort air-conditioning is hardly attainable in the bi-level mode.

To the contrary, in this embodiment, the foot door 28 is formed into the butterfly door, so that a space, known as an auxiliary passage 30, is defined between the tip of the second plate door 28c of the foot door 28 and the rear face 11a of the casing 11 when the foot door 28 is moved to the halfway open position as shown with the solid lines in FIGS. 1 and 2. Therefore, as shown in the enlarged view of FIG. 2, the warm air d1 flowing from the air mixing unit 21 into the foot passage 27 is partially divided and introduced into the auxiliary passage 30 as indicated by arrow "d2", and the partial air "d2" can be mixed with the cool air "c1" in the face passage 24. As a result, it is possible to increase the temperature of the air blowing out of the face opening 22 to the face so that the temperature difference between the upward air and the downward air is reduced to an appropriate range of 10C to 15C. Hence it is possible to achieve improvement in comfort air-conditioning in the bi-level mode.

Next, when the foot mode is selected, the foot door 28 moves to position "E" shown by the chain double-dashed lines in FIGS. 1 and 2. Then the foot door 28 opens the foot opening 27a of the foot passage 27 completely and closes the face passage 24 completely. For this reason, the air to be temperature-conditioned by the air mixing unit 21 passes through the foot opening 27a, the foot passage 27, and the side openings 27b, and blows solely out to the feet of the passenger(s).

Here, if a notched opening is provided on part of the first plate door 28b of the foot door 28, so that this notched opening partially opens the face passage 24 when the foot door 28 is moved to position "E", shown with the chain double-dashed lines in FIGS. 1 and 2, while allowing the face door 25 to open the defroster opening 23, then the air from the air mixing unit 21 can partially pass through the face passage 24 as well as the defroster opening 23 and blow out to the windshield of the vehicle.

In this case, the shape of the foot opening 27a needs to be modified appropriately so that the notched opening of the first plate door 28b of the foot door 28 is shut down in the face mode.

Next, when the foot defroster mode is selected, the face door 25 is moved to the position drawn by the chain double-dashed lines in FIG. 1. Accordingly, the face opening 22 is completely closed and the defroster opening 23 is completely opened. In addition, the foot door 28 is moved to the position drawn by the solid lines in FIGS. 1 and 2, so that the foot opening 27a of the foot passage 27 and the face passage 24 are both made to open about the same degrees at the same time. In this way, the air that is temperature-controlled by the air mixing unit 21 passes through the face passage 24 as well as the defroster opening 23 and blows out to the windshield of the vehicle for defrosting. Simultaneously, the air being temperature-controlled by the air mixing unit 21 passes through the foot opening 27a, the foot passage 27 and the side openings 27b, and blows out to the feet of the passenger(s) for heating.

In the foot defroster mode, the warm air "d1" flowing in the foot passage 27 can be partially separated and introduced into the auxiliary passage 30 as indicated by the arrow "d2", similarly to the bi-level mode. Accordingly, the partial air "d2" can be mixed with the cool air "c1" in the face passage 24. As a result, it is possible to adjust the temperature difference between the upward air and the downward air into an appropriate range as previously described. Hence it is possible to achieve comfort improvements in air-conditioning in the foot defroster mode as well.

Next, when the defroster mode is selected, the face door 25 is moved to the position drawn by the chain double-dashed lines shown in FIG. 1. Accordingly, the face opening 22 is completely closed and the defroster opening 23 is completely opened. Additionally, the foot door 28 is moved to position "D" drawn by the chain double-dashed lines shown in FIG. 1, so that the foot opening 27a of the foot passage 27 is completely closed and the face passage 24 is completely opened. In this way, the air being temperature-controlled by the air mixing unit 21 entirely passes through the face passage 24 as well as the defroster opening 23 and blows out to the windshield of the vehicle for more effective defrosting.

Incidentally, in the comparative example of FIG. 3, the foot door 28 and the foot passage 27 are formed in accordance with the same concepts as the prior art disclosed in Japanese Patent Laid-Open Publication No. 2001-150923. Therefore, the foot passage 27 is disposed so as to protrude further rearward from the rear face 11a of the casing 11. Accordingly, the dimension of the interior unit 10 is increased with respect to the cross direction of the vehicle. To the contrary, such rearward protrusion of the interior unit 10 for such a foot passage 27 is avoidable in this embodiment. As a result, this embodiment can achieve a reduction in the dimension of the interior unit 10 in the cross direction of the vehicle as compared to the comparative example of FIG. 3 or the prior art.

Moreover, in this embodiment, the foot door 28 is formed into the butterfly door which includes the first and second plate doors 28b and 28c that are integrally bonded to different and opposing sides of the rotating shaft 28a. Therefore, when the foot door 28 is moved to position E of FIGS. 1 and 2 and wind pressure of the air is applied to the first and the second plate doors 28b, 28c, forces "F1" and "F2" (see FIG. 2) attributable to the wind pressure acting on the first and second plate doors 28b, 28c also act as reverse rotating forces while using the rotating shaft 28a as a pivot. Accordingly, the forces "F1" and "F2" attributable to the wind pressure applied to the first and second plate doors 28b, 28c act in canceling directions. As a result, it is possible to reduce a control force of the foot door 28 upon rotating the foot door 28 from position "E" to position "D." Similarly, since the air mix door 16 is also formed into the butterfly door, it is possible to reduce a control force thereof.

(Other Embodiments)

Although description has been made in the foregoing embodiment regarding the air mixing type interior unit which controls the temperature of the air blowing into the compartment by use of the air mix door 16, the present invention is also applicable to a hot water control type interior unit which controls the temperature of the air blowing into the compartment by adjusting the flow quantity or the temperature of the hot water circulating through the heater core 14.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle air-conditioning system, comprising:

a casing defining air passages for guiding air to a vehicle compartment and defining a face opening, wherein the face opening is disposed in an upper part of the casing;

a heating heat exchanger disposed inside the casing, wherein the heating heat exchanger heats the air;

a face passage defined within the casing and located above the heating heat exchanger for guiding temperature-conditioned air to the face opening;

a foot passage defined within the casing and located above the heating heat exchanger, wherein the foot passage extends form a rear surface of the casing toward the face passage, is situated to extend parallel to a width dimension of a vehicle, and has a foot opening disposed in a region of the foot passage proximate to the face passage; and a foot door disposed inside the face passage to rotably open and close the foot opening, wherein the foot door is a butterfly door and further comprises:

a rotating shaft; and a first plate door and a second plate door integrally bonded and oppositely situated on the rotating shaft; wherein the air, being temperature-conditioned by passage through the heating heat exchanger, flows from the foot opening into the foot passage when the foot opening is opened by the foot door and blows out of right and left side ducts directed parallel to the width dimension of the vehicle;

an air mix door is approximately vertically disposed between the heating heat exchanger and the butterfly door within the casing, a proportion of warm air passing through the heating heat exchanger and cool air bypassing the heating heat exchanger is adjusted by the air mix door to control a temperature of air blowing into the vehicle compartment, the first plate door separates air in a warm air region from air in a cool air region when the butterfly door is set to a halfway open position, and directs the air in the warm air region toward the foot passage and the air in the cool air region toward the face passage, and an auxiliary passage is formed close to a tip of the second plate door such that the air in the warm air region being directed to the foot passage is divided and directed toward the face passage.

2. The vehicle air-conditioning system according to claim 1, wherein a blower unit for blowing air is disposed within the casing in front of the face passage with respect to the width dimension of the vehicle.

3. The vehicle air-conditioning system according to claim 1, wherein a blower unit is disposed within the casing above and in front of the face passage with respect to the vehicle, and a cooling heat exchanger is disposed within the casing below the blower unit to cool the air blown from the blower unit, and the heating heat exchanger is disposed behind the cooling heat exchanger with respect to the vehicle.

4. The vehicle air-conditioning system according to claim 1, wherein a warm air guide wall, for guiding the warm air passing through the heating heat exchanger toward the cool air, protrudes upward from a rear face of the casing and extends over the heating heat exchanger, and the foot passage is disposed above the warm air guide wall.

\* \* \* \* \*